(12) United States Patent
Beaudet et al.

(10) Patent No.: US 10,178,926 B2
(45) Date of Patent: Jan. 15, 2019

(54) DEVICE TO PRODUCE MILK-BASED DRINKS WITH SAFETY MECHANISMS AND COFFEE MAKER CONTAINING SUCH A DEVICE

(71) Applicant: SEB S.A., Ecully (FR)

(72) Inventors: Olivier Beaudet, Geneslay (FR); Christophe Guerin, St Christophe du Luat (FR)

(73) Assignee: SEB S.A., Ecully (FR)

( * ) Notice: Subject to any disclaimer, the term of this patent is extended or adjusted under 35 U.S.C. 154(b) by 668 days.

(21) Appl. No.: 14/719,970

(22) Filed: May 22, 2015

(65) Prior Publication Data
US 2015/0335196 A1   Nov. 26, 2015

(30) Foreign Application Priority Data
May 23, 2014   (FR) ...................................... 14 54671

(51) Int. Cl.
*A47J 31/44* (2006.01)
*B01F 3/04* (2006.01)

(52) U.S. Cl.
CPC ....... *A47J 31/4496* (2013.01); *A47J 31/4485* (2013.01); *A47J 31/4489* (2013.01); *B01F 3/04446* (2013.01); *B01F 2215/0006* (2013.01)

(58) Field of Classification Search
CPC ................ A47J 31/4485; A47J 31/4403; A47J 31/4496; A47J 31/4489; A47J 31/4482
USPC ........... 426/596; 99/293, 314, 315, 318, 323
See application file for complete search history.

(56) References Cited

U.S. PATENT DOCUMENTS

| | | | | |
|---|---|---|---|---|
| 4,345,516 A | * | 8/1982 | Sinclair | A47J 37/108 249/115 |
| 4,825,505 A | * | 5/1989 | Witte | A47J 45/072 16/425 |
| 7,565,745 B2 | * | 7/2009 | Von Schoultz | A47J 43/26 30/120.2 |

(Continued)

FOREIGN PATENT DOCUMENTS

| | | |
|---|---|---|
| EP | 2047779 A1 | 4/2009 |
| EP | 2606783 A1 | 6/2013 |

(Continued)

*Primary Examiner* — Ibrahime A Abraham
*Assistant Examiner* — Jimmy Chou
(74) *Attorney, Agent, or Firm* — The Webb Law Firm

(57) ABSTRACT

Provided is a milk-based drink production device with a connection system designed to work with a steam output nozzle tip of a coffee maker, where said connection system has a connected position, in which a watertight connection is formed between the steam output nozzle tip and the device, and a disconnected position, in which the device may be separated from the steam output nozzle tip, and the device contains a frothing system which shifts between an installed position on the device and a position removed from the device. The device contains extraction safety mechanisms which prevent the frothing system from moving from the installed position to the removed position when the connection system is in the connected position and/or connection safety mechanisms which prevent the connection system from moving from the disconnected position to the connected position when the frothing system is not in the installed position.

14 Claims, 6 Drawing Sheets

(56) References Cited

U.S. PATENT DOCUMENTS

| | | | |
|---|---|---|---|
| 8,505,788 B2* | 8/2013 | Thibault | B44D 3/14 |
| | | | 16/425 |
| 9,380,908 B2* | 7/2016 | Aeberhard | A47J 31/4485 |
| 2007/0243305 A1* | 10/2007 | Marconi | A47J 31/4485 |
| | | | 426/596 |
| 2008/0188365 A1* | 8/2008 | Dalla Piazza | A47J 43/24 |
| | | | 494/84 |
| 2011/0100230 A1* | 5/2011 | Cheng | A47J 31/4485 |
| | | | 99/293 |
| 2012/0297989 A1* | 11/2012 | Tonelli | A47J 31/4485 |
| | | | 99/293 |
| 2013/0019903 A1* | 1/2013 | Rizzuto | A47J 31/46 |
| | | | 134/22.15 |
| 2014/0123858 A1* | 5/2014 | Rellis | A47J 31/46 |
| | | | 99/293 |
| 2016/0106257 A1* | 4/2016 | Ferraro | A47J 31/4403 |
| | | | 99/293 |
| 2016/0113436 A1* | 4/2016 | Noordhuis | A47J 31/4485 |
| | | | 99/293 |

FOREIGN PATENT DOCUMENTS

| WO | 2010044116 A2 | 4/2010 |
|---|---|---|
| WO | 2011064702 A1 | 6/2011 |

* cited by examiner

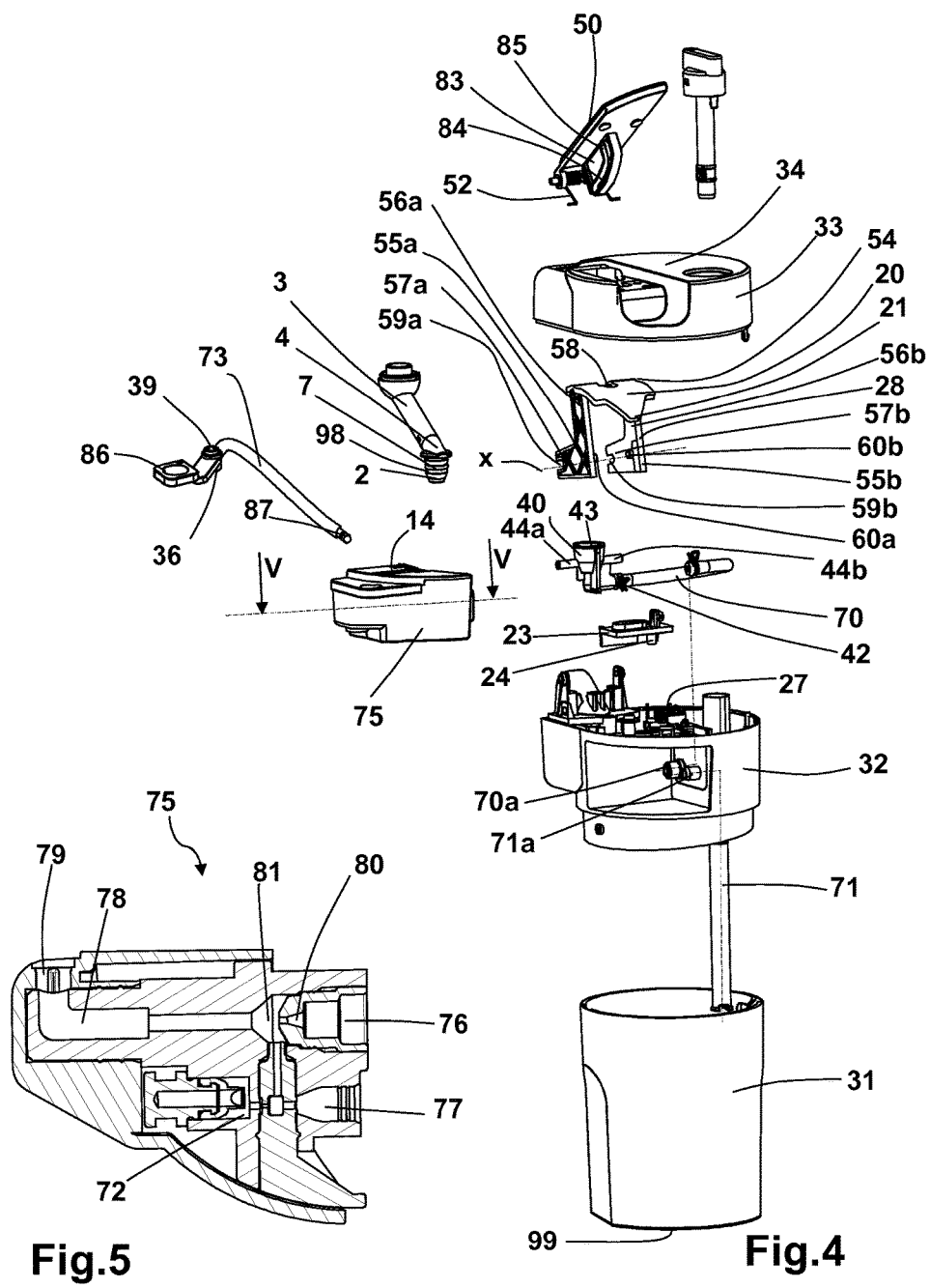

DEVICE TO PRODUCE MILK-BASED DRINKS WITH SAFETY MECHANISMS AND COFFEE MAKER CONTAINING SUCH A DEVICE

CROSS-REFERENCE TO RELATED APPLICATION

This application claims priority to French Patent Application No. 1454671 filed May 23, 2014, the disclosure of which is hereby incorporated in its entirety by reference.

FIELD OF THE INVENTION

This invention falls into the general technical field of milk-based drink-production equipment, in particular, devices designed to work with a steam output nozzle tip of a coffee maker to produce a milk-based drink, in particular, hot and frothed milk.

DESCRIPTION OF RELATED ART

Known art is document EP2047779 to create a milk-based drink production device with a connection system designed to work with a steam output nozzle tip of a coffee maker, where said connection system creates, in a connected position, a watertight connection between the steam output nozzle tip and the device and, in a disconnected position, the device is separated from the steam output nozzle tip. The device contains a conduit to distribute the milk-based drink, which can shift between an installed position on the device and a position removed from the device. The distribution conduit is articulated in a horizontal channel oriented toward the user.

In operation, the user can connect the device to the steam output nozzle tip of a coffee maker, having forgotten to attach the steam distribution conduit, and initiate a milk-based drink production cycle. As a result, a jet consisting of steam and the drink is projected forward and could injure the user.

During a milk-based drink distribution cycle, the user can also move the steam distribution conduit and accidentally remove the device. Then, as in the prior case, a jet consisting of steam and the drink is projected forward and may injure the user.

One objective of this invention is to resolve the aforementioned inconvenience and offer a milk-based drink production device and a coffee maker that works with this device which is simple and ergonomic to implement and which operates safely.

Another purpose of this invention is to offer a milk-based drink production device and a coffee maker which works with this device which has a simple design and is economic to use.

SUMMARY OF THE INVENTION

These objectives are achieved with a milk-based drink production device containing a connection system designed to accommodate a steam output nozzle tip of a coffee maker; said connection system has a connected position, in which a watertight connection is formed between the steam output nozzle tip and the device, and a disconnected position, in which the device may be separated from the steam output nozzle tip and the device has a removable frothing system alternating between an installed position on the device and a removed position from the device, characterized by the fact that the device contains extraction safety mechanisms which prevent the frothing system from moving from the installed position to the removed position when the connection system is in the connected position and/or connection safety mechanisms which prevent the connection system from moving from the disconnected position to the connected position when the frothing system is not in the installed position.

Therefore, the user cannot connect the device to the steam output nozzle tip of the coffee maker if the frothing system is not in the installed position. Accordingly, the risk of a jet of steam from the device if the frothing system is not present is eliminated.

In operation, when a milk-based drink production cycle is ongoing, the user cannot remove the frothing system. Accordingly, the risk of a jet of steam from the device if the frothing system is not present is eliminated.

Advantageously, the extraction safety mechanisms and/or the connection safety mechanisms are mechanical devices.

This arrangement allows extraction safety mechanisms and/or connection safety mechanisms which are simple and reliable.

Advantageously, the frothing system extraction safety mechanisms include a bolt which is part of the connection system, where said bolt shifts between a position to secure the frothing system when the connection system is in the connected position and a position to release the frothing system when the connection system is in the disconnected position.

Preferably, in the secured position, the bolt works with a cavity in the frothing system.

These arrangements create frothing system extraction safety mechanisms which have a simple design and are easy to use. The cavity and bolt may include chamfers or inclined partitions to ease insertion of the bolt into the cavity.

Advantageously, the bolt can rotate.

This arrangement allows the mobile bolt to be used easily.

Preferably, the connection system contains a mobile jaw, a lever and a transfer piece to move the lever to the mobile jaw, where the transfer piece includes the bolt.

Advantageously, the connection safety mechanisms include a stop which shifts between a locked position and a released position.

Preferably, the stop contains an outgrowth which works with the frothing system to allow the stop to shift between a locked position and a released position when the frothing system shifts from the removed position to the installed position.

Advantageously, the connection safety mechanisms include a recall device to move the stop from the released position to the locked position.

This arrangement allows an automatic return of the stop from the released position to the locked position.

Preferably, the recall device includes a spring.

This arrangement allows for a recall device which is very easy to use.

Advantageously, the connection safety mechanisms include a mobile body which is part of the connection system, where said mobile body works with the stop to lock the connection system when the stop is in the locked position and releases the connection system when the stop is in the released position.

Preferably, the connection system contains a mobile jaw, a lever and a transfer piece to move the lever to the mobile jaw, with the mobile body being formed by the transfer piece.

The invention also applies to a coffee maker with a milk-based drink production device as previously described.

Advantageously, the steam output nozzle tip is bent down.

Accordingly, in the event of improper operation, in particular, if a steam output command is triggered when the device is not in the correct position, the steam jet is directed downward and not at the user. Accordingly, this arrangement provides for safer operation, even when operated improperly.

BRIEF DESCRIPTION OF THE DRAWINGS

The invention will be better understood by reviewing various embodiments, which are not in any manner limitative, and which are illustrated in the attached figures in which:

FIG. 4 shows an exploded side view of the milk-based drink production device and the steam output nozzle tip shown in FIG. 1.

FIG. 5 shows a cross-section along line V of the frothing system of the milk-based drink production device shown in FIG. 4.

DETAILED DESCRIPTION OF THE INVENTION

Figure 1:
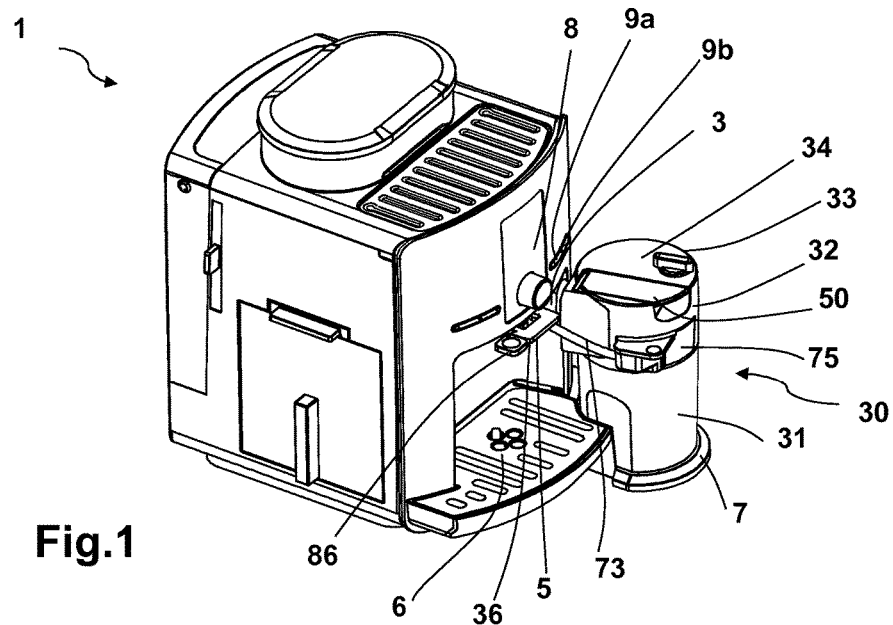
FIG. 1 shows a side view of a milk-based drink production device working with a steam output nozzle tip of a coffee maker in accordance with a specific embodiment of the invention.

In the embodiment shown in FIG. 1, milk-based drink production device 30 is connected to steam output nozzle tip 2 of coffee maker 1. Coffee maker 1 contains a boiler (not shown on the diagrams) which produces hot water and/or steam to feed steam output nozzle tip 2. Coffee maker 1 contains articulated steam conduit 3 (FIG. 3) which extends to the exterior of coffee maker 1 and ends at steam output nozzle tip 2. Steam output nozzle tip 2 is positioned vertically so that the steam jet is directed downward. Coffee maker 1 contains an infusion chamber (not shown on the diagrams) fed by hot water to prepare coffee which is dispensed through coffee output nozzle 5 located above cup rest 6 which holds a receptacle (not shown on the diagrams).

Coffee maker 1 can simply be a coffee maker with a frothing nozzle and a removable milk heating mechanism as described in patent filing EP2606783. The frothing and heating nozzle mechanism is disconnected from steam output nozzle tip 2 and milk-based drink production device 30, which produces, in particular, hot and frothed milk, is connected in its place to steam output nozzle tip 2. Device 30 has distribution conduit 73 for hot and frothed milk, including free extremity 36. Extremity 36, through which hot and frothed milk flows, is positioned near coffee output nozzle 5 so that it can be disconnected to make, in particular, cappuccino. Coffee maker 1 may include stand 7 for device 30 positioned next to cup rest 6. Coffee maker 1 contains control panel 8 with, in particular, control button 9a for a steam production cycle. Control panel 8 may include control button 9b for dispensing cappuccino, which triggers a hot milk frothed distribution cycle and a distribution cycle for coffee.

In FIGS. 4 and 5, device 30 contains reservoir 31 to accept milk and frothing system 75. Frothing system 75 is in the form of a removable cassette of device 30 to facilitate cleaning. Device 30 contains cover 32 on reservoir 31. Frothing system 75 is positioned on cover 32 and is removable. Device 30 contains steam input conduit 70, milk conduit 71, air conduit 72 and hot and frothed milk distribution conduit 73. Steam input conduit 70 contains extremity 70a which is connected to frothing system 75 through input chamber 76. Input chamber 76 includes converging section 80 to create a Venturi effect when steam is injected, i.e., to create a depression in cavity 81 located above converging section 80. Milk conduit 71 contains extremity 71a which is connected to frothing system 75 through input chamber 77 linked to cavity 81. Frothing system 75 contains air conduit 72 which connects outside air to cavity 81. The depression created in cavity 81 in which milk and air are aspirated and mixed with steam to create frothed milk. Frothed milk distribution conduit 73 is connected to frothing system 75 through output chamber 78 linked to cavity 81.

As shown in FIGS. 4 to 8, milk-based drink production device 30 contains a connection system at the steam output nozzle tip 2 with fixed jaw 46 and mobile jaw 40. Jaw 40 moves between a connected position in which a watertight connection is formed between steam output nozzle tip 2 and steam input conduit 70 and in which device 30 cannot be separated from steam output nozzle tip 2, and a disconnected position in which device 30 may be separated from steam output nozzle tip 2. Mobile jaw 40 is formed by receptacle 41, which consists of lateral conduit 42 to steam input conduit 70. Accordingly, mobile jaw 40 forms an extremity of steam input conduit 70. To allow jaw 40 to move, steam input conduit 70 is made at least partially of a flexible material. Receptacle 41 is generally conical in shape reflecting the external shape of steam output nozzle tip 2. Receptacle 41 contains upper opening 43 in which steam output nozzle tip 2 is inserted when making the connection.

Figure 7:
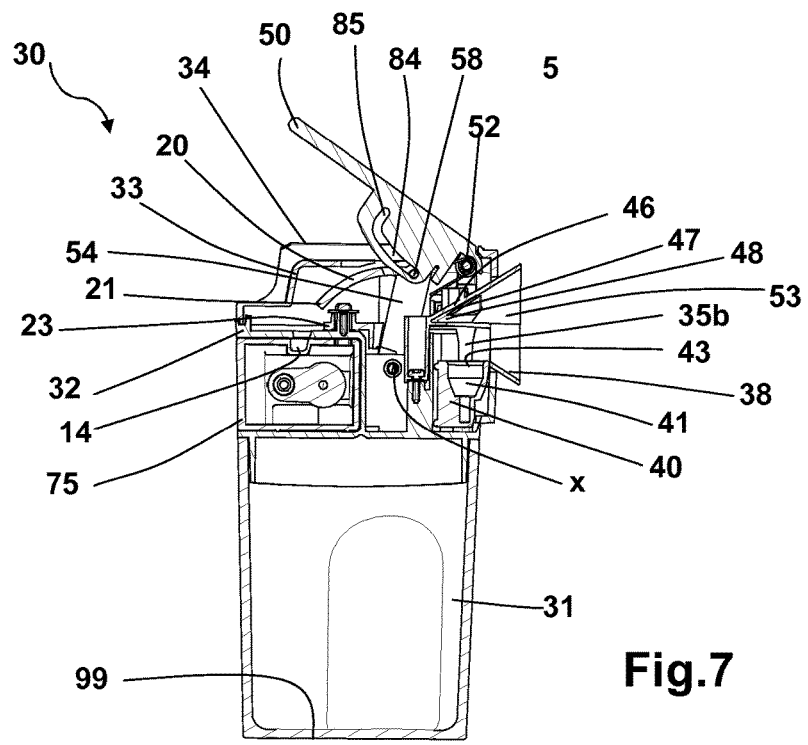
FIG. 7 shows a cross-section along line VII of the milk-based drink production device shown in FIG. 3.
Figure 8:
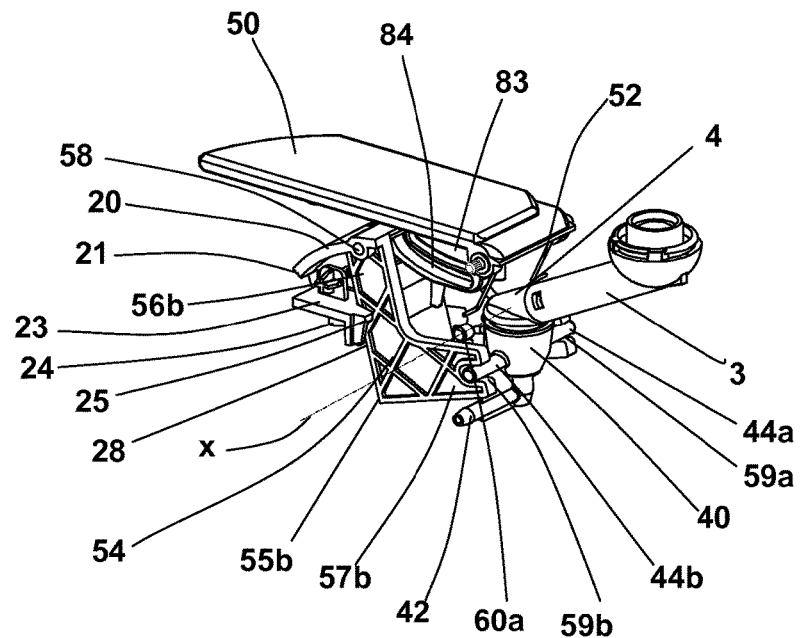
FIG. 8 shows a side view of the mobile jaw movement mechanism of the milk-based drink production device and the steam output nozzle tip shown in FIG. 1.

Mobile jaw 40 is located on cover 32 and moves vertically against fixed jaw 46 when making the connection. Mobile jaw 40 contains two lateral trunnions 44a and 44b which match two slits 35a (not shown on the diagrams) and 35b located on cover 32. Fixed jaw 46 is positioned on cover 32, above mobile jaw 40, and includes partition 47 which creates input housing 48 of upper face 4 of steam output nozzle tip 2 (FIG. 7).

Cover 32 contains truncated cone-shaped partition 38 which extends radially to the exterior and forms input housing 53 to guide steam output nozzle tip 2 above mobile jaw 40 when making the connection.

Figures 2, 3:
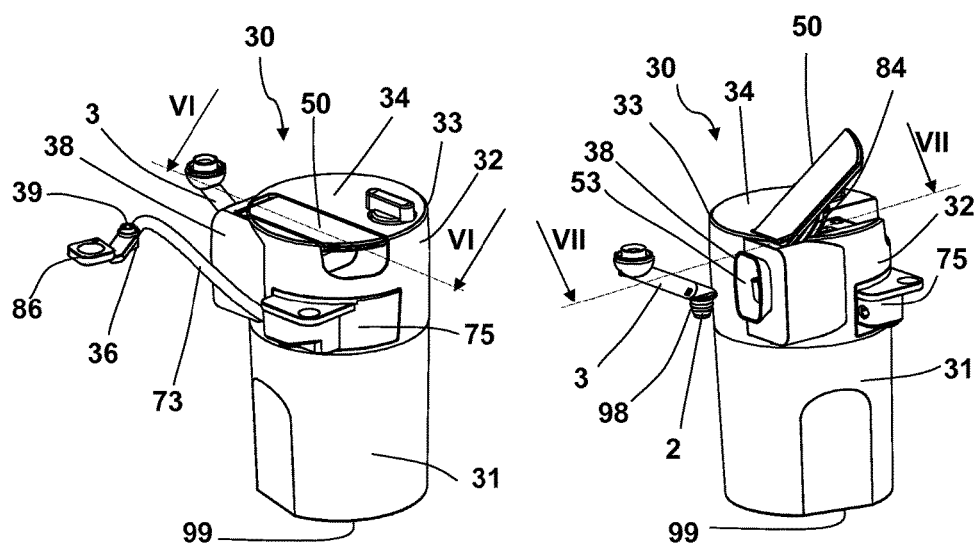
FIG. 2 shows a side view of the milk-based drink production device working with the steam output nozzle tip in a connected position, shown in FIG. 1.
FIG. 3 shows a side view of the milk-based drink production device shown in FIG. 1, where the device and the steam output nozzle tip are in a disconnected position.
Figure 6:
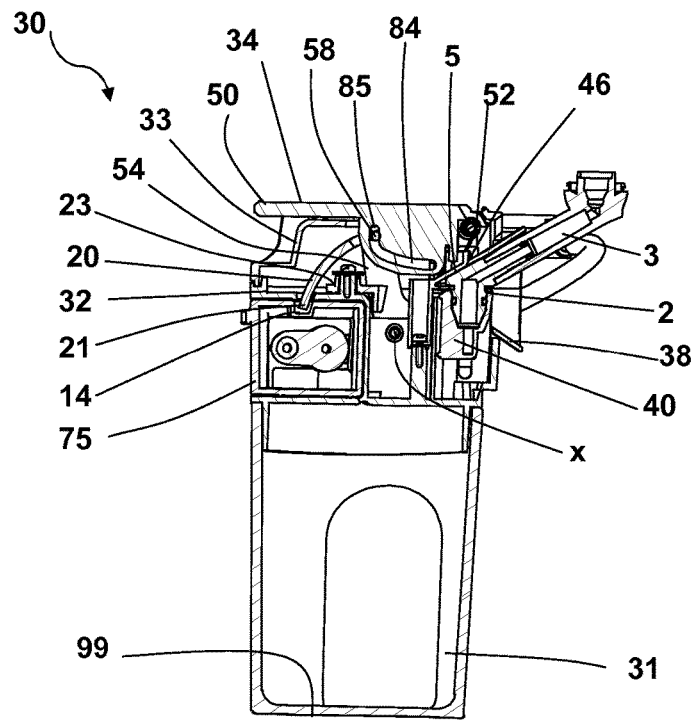
FIG. 6 shows a cross-section along line VI of the milk-based drink production device and the steam output nozzle tip shown in FIG. 2.

The connection system contains lever 50 of mobile jaw 40. Cover 32 contains an upper hood 33 which creates upper face 34 of cover 32 on which lever 50 is located. Lever 50 moves between an opened position above upper face 34 in which mobile jaw 40 is in a disconnected position (FIGS. 3 and 7) and a folded position on upper face 34 in which mobile jaw 40 is in a connected position (FIGS. 2 and 6). Lever 50 contains lower rib 83 including cam track 84.

The connection system contains transfer piece 54 to move lever 50 to mobile jaw 40. Transfer piece 54 contains two parallel, L-shaped lateral partitions 55a and 55b. Therefore, each lateral partition 55a and 55b contains large branch 56a and 56b and small branch 57a and 57b all interconnected at the base of the L. At the base of the L, transfer piece 54 has two trunnions 60a and 60b. Accordingly, the transfer piece is mounted to rotate on cover 32 around an axis x traversing trunnions 60a and 60b. Large branches 56a and 56b are interconnected at their extremities by rod 58. At their extremities, small branches 57a and 57b have elongated, oblong housings 59a and 59b. Rod 58 works with cam track 84 of lever 50 and housings 59a and 59b work with trunnions 44a and 44b of mobile jaw 40. Cam track 84 contains extremity section 85 which is almost vertical when lever 50 is in a folded position and which forms an inflexion point in cam track 84's profile. Lever 50 is held in an opened position by recall spring 52.

Figure 9:
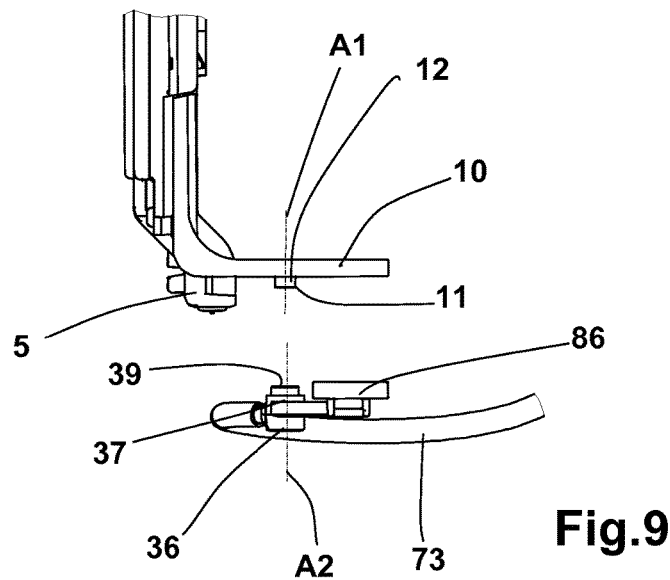
FIG. 9 shows an exploded, detailed view of the coffee output nozzle and the extremity of the distribution conduit of the milk-based drink production device and the coffee maker shown in FIG. 1.

In FIG. 9, coffee output nozzle 5 contains grip tab 10 which extends horizontally to the exterior of the coffee maker. Grip tab 10 includes protuberance 11, which is basically cylindrical along axis A1, and which extends downward. Protuberance 11 includes magnetic part 12 which could be made of, for instance, ferromagnetic steel.

Extremity 36 of distribution conduit 73 contains magnet 37 positioned under input housing 39. Input housing 39 is cylindrical along axis A2, which complements the shape of protuberance 11 with which it is designed to work to attach extremity 36 to coffee output nozzle 5. Extremity 36 of distribution conduit 73 contains gripping handle 86, which extends perpendicularly along axis A2 of input housing 39.

Figure 10:
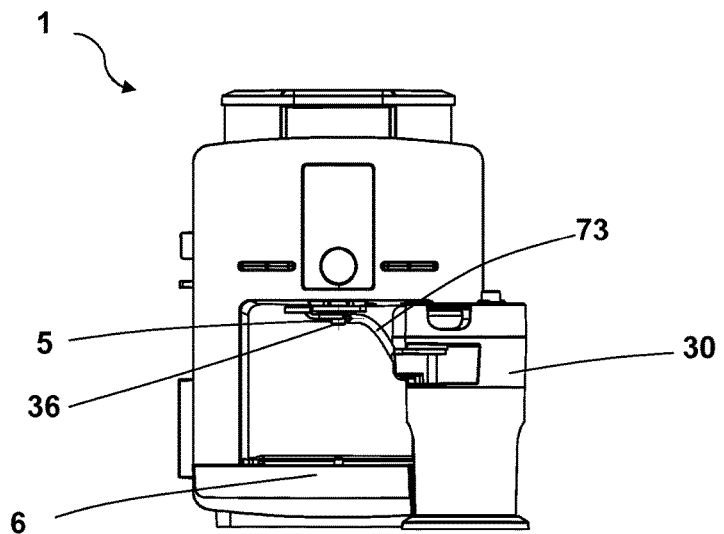
FIG. 10 shows a frontal view of the milk-based drink production device working with the coffee maker shown in FIG. 1, where the coffee output nozzle and the extremity of the distribution conduit are in a raised position.
Figure 11:
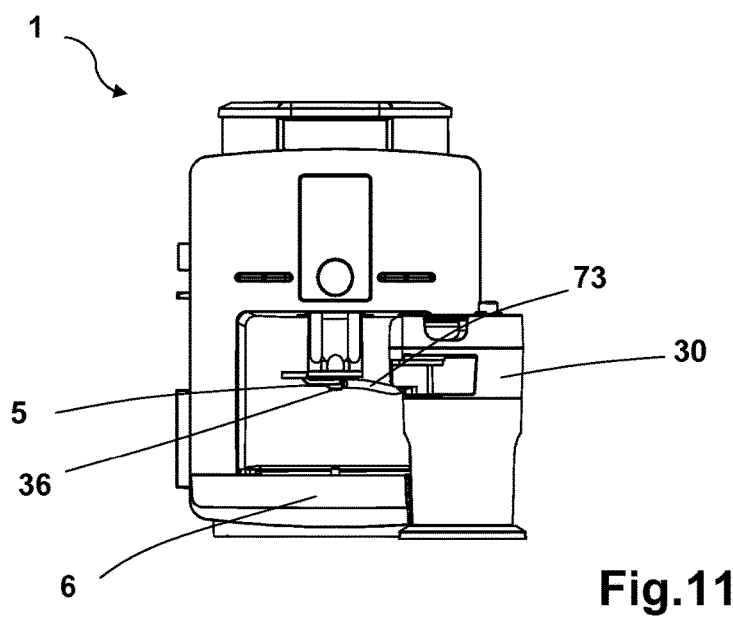
FIG. 11 shows a frontal view of the milk-based drink production device working with the coffee maker shown in FIG. 1, where the coffee output nozzle and the extremity of the distribution conduit are in a lowered position.
Figure 12:
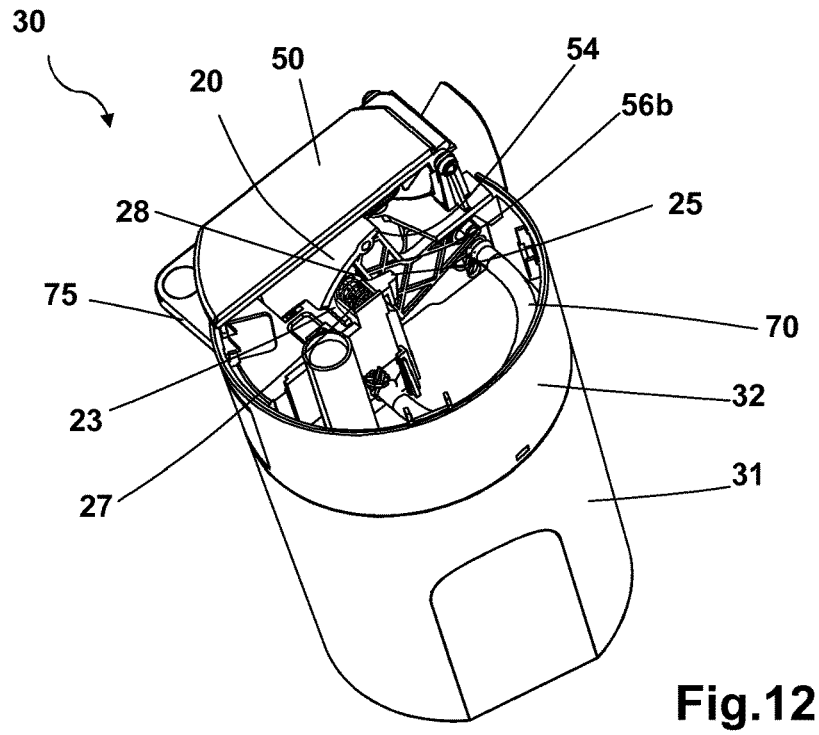
FIG. 12 shows a cutaway side view of the milk-based drink production device shown in FIG. 1, where the frothing system is in an installed position and the connection system in a connected position.

As shown in FIGS. 10 and 11, extremity 36 of distribution conduit 73 is positioned on coffee output nozzle 5. Coffee output nozzle 5 shifts between a raised position (FIG. 10) in which a large receptacle may be placed on cup rest 6 and a lowered position (FIG. 11) in which a small receptacle may be placed on cup rest 6. The center of distribution conduit 73 consists of a flexible silicone tube.

In FIGS. 4 and 5, distribution conduit 73 contains cylindrical nozzle 87. Nozzle 87 is designed to work with extremity 79 (FIG. 5) of output chamber 78 of frothing system 75. Extremity 79 is shaped to complement the cylindrical shape of nozzle 87 and has a flexible coating to connect, in a watertight manner, or separate, distribution conduct 73 to, or from, frothing system 75.

As shown in FIGS. 4 to 7, 12 and 13, transfer piece 54 of the connection system contains partition 20 in the shape of a circular arc. Partition 20 contains a trapezoidal extremity which forms bolt 21. Bolt 21 moves between a position to secure (FIGS. 6 and 12) frothing system 75 when the connection system is in the connected position and a position (FIGS. 7 and 13) to release the frothing system when the connection system is disconnected.

Figure 13:
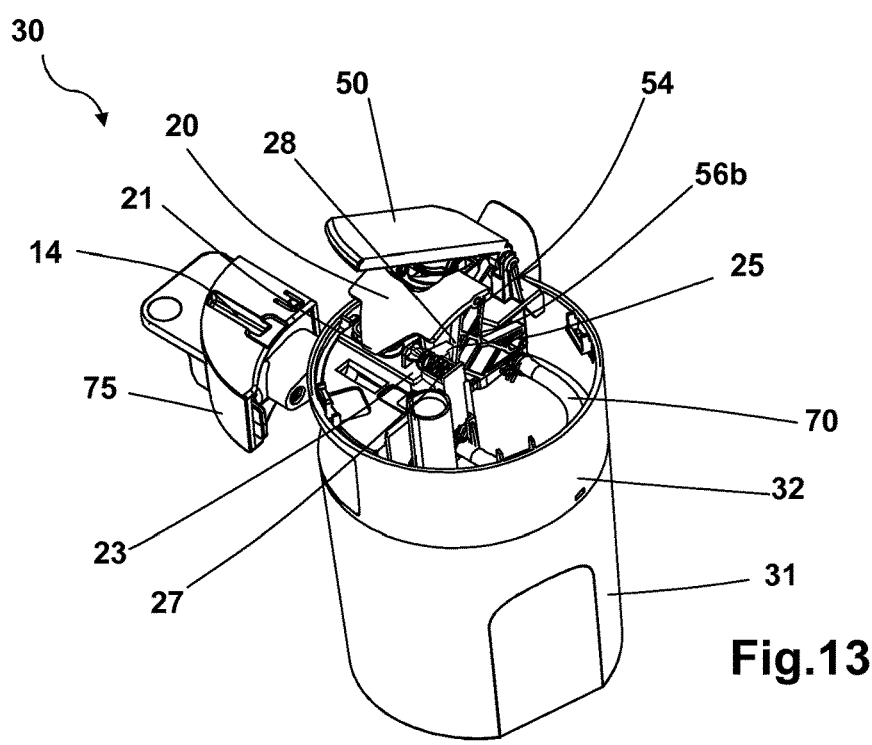
FIG. 13 shows a cutaway side view of the milk-based drink production device shown in FIG. 1, where the frothing system is removed and the connection system is disconnected.

Frothing system 75 can be shifted on cover 32 between an installed position (FIG. 12) and a removed position (FIG. 13). It is shifted from the removed position to the installed position by a horizontal movement. The frothing system contains cavity 14. Bolt 21 in the secured position is located in cavity 14 to prevent frothing system 75 from being removed. Bolt 21 in the released position is located outside cavity 14 to allow frothing system 75 to be removed.

In FIGS. 4 to 8, 12 and 13, device 30 contains a stop 23 positioned on cover 32 to slide back and forth between a blocked position and a released position. Stop 23 contains outgrowth 24 (FIG. 4) which works with frothing system 75 to allow stop 23 to move between the locked and released positions when frothing system 75 is shifted from the removed to the installed position. Stop 23 is controlled by recall spring 27 to move stop 23 from the released position to the locked position.

Stop 23 contains boss 25 which extends to transfer piece 54, more specifically to face 28 of large branch 57b. When the connection system is in the disconnected position and frothing system 75 is in the removed position, stop 23 is in the locked position in which boss 25 is positioned in alignment with face 28 (FIG. 13). Accordingly, transfer piece 54 cannot pivot and the connection system is immobilized. If frothing system 75 is installed, frothing system 75 works with outgrowth 24 to allow stop 23 to move to a released position in which boss 25 is separated from face 28 (FIGS. and 12). Accordingly, transfer piece 54 may pivot and the connection system is released.

In operation, the user pours milk into reservoir 31 and positions cover 32 over reservoir 31. He lifts lever 50, and in doing so, cam track 84 acts on rod 58 of transfer piece 54 to pivot it. Pivoting transfer piece 54 causes housings 59a and 59b to pivot, which moves trunnions 44a and 44b and mobile jaw 40 lower, away from fixed jaw 46 to create a space to accept steam output nozzle tip 2 (FIG. 7).

Moving device 30 generally horizontally toward coffee maker 1, the user positions fixed jaw 46 on upper face 4 of steam output nozzle tip 2 and mobile jaw 40 under steam output nozzle tip 2 and places device 30 on base 7 of coffee maker 1. He then shifts lever 50 to the folded position on upper face 34 of cover 32, which results in moving mobile jaw 40 against fixed jaw 46 to immobilize steam output nozzle tip 2 and create a watertight connection between steam output nozzle tip 2 and steam input conduit 70.

The user takes hold of gripping handle 86 of extremity 36 of distribution conduit 73 and assembles input housing 39 on protuberance 11 of coffee output nozzle 5. Magnet 37 and magnetic section 12 hold this assemblage together. The user may then place a receptacle on cup rest 6 and adjust the position of coffee output nozzle 5 and extremity 36.

The user then presses cappuccino distribution control button 9b, which triggers a hot milk frothed distribution cycle and a distribution cycle for coffee. The boiler of coffee maker 1 is initially activated to generate a flow of steam which circulates through steam output nozzle tip 2 and steam input conduit 70 to enter frothing system 75. Mixing air and milk with steam forms the hot and frothed milk which moves through extremity 36 into the receptacle. When the programmed quantity of frothed milk is reached, the coffee maker completes a distribution cycle for coffee which flows into the receptacle through nozzle coffee output 5. A cappuccino-type drink may therefore be prepared automatically after pressing control button 9b, without the user taking action.

The user may then remove extremity 36 from coffee output nozzle 5 and raise lever 50 from the opened position to disconnect device 30 from coffee maker 1.

Of course, the invention is not in any manner limited to the embodiment described and illustrated, which is only provided as an example. Other modifications are possible by, in particular, combining various items or substituting equivalent techniques, without, however, falling outside the protection of the invention.

The invention claimed is:

1. A milk-based drink production device comprising a connection system designed to work with a steam output nozzle tip of a coffee maker, where said connection system has a connected position, in which a watertight connection is formed between the steam output nozzle tip and the milk-based drink production device, and a disconnected position, in which the milk-based drink production device may be separated from the steam output nozzle tip, where the milk-based drink production device contains a removable frothing system between an installed position on the milk-based drink production device and a withdrawn position removed from the milk-based drink production device, wherein the milk-based drink production device contains extraction safety mechanisms comprising a bolt and which prevents the removable frothing system from switching from the installed position to the withdrawn position when the connection system is in the connected position and, optionally connection safety mechanisms comprising a stop and which prevent the connection system from switching from the disconnected position to the connected position when the frothing system is not in the installed position, wherein the connection system comprises a transfer piece having a partition in a shape of a circular arc that contains a trapezoidal extremity which forms the bolt.

2. The milk-based drink production device in accordance with claim 1, wherein the extraction safety mechanisms and/or the connection safety mechanisms are mechanical devices.

3. The milk-based drink production device in accordance with claim 1, wherein said bolt shifts between a position to secure the frothing system when the connection system is in the connected position and a position to release the frothing system when the connection system is in the disconnected position.

4. The milk-based drink production device in accordance with claim 3, wherein the bolt cooperates in the installed position with a cavity in the frothing system.

5. The milk-based drink production device in accordance with claim 3, wherein the bolt rotates.

6. The milk-based drink production device in accordance with claim 3, wherein the connection system contains a mobile jaw, and a lever, and wherein the transfer piece is configured to pivot to allow the lever to move toward the mobile jaw.

7. The milk-based drink production device in accordance with claim 1, wherein the shifts between a locked position and a released position.

8. The milk-based drink production device in accordance with claim 7, wherein the stop contains an outgrowth which works with the frothing system to shift the stop from the locked position to the released position when the frothing system moves from the withdrawn position to the installed position.

9. The milk-based drink production device in accordance with claim 7, wherein the connection safety mechanisms include a recall device to pull the stop from the released position to the locked position.

10. The milk-based drink production device in accordance with claim 9, wherein the recall device includes a spring.

11. The milk-based drink production device in accordance with claim 7, wherein the connection safety mechanisms include a mobile body which is part of the connection system, where said mobile body works with the stop to immobilize the connection system when the stop is in the locked position and to release the connection system when the stop is in the released position.

12. The milk-based drink production device in accordance with claim 11, wherein the connection system contains a mobile jaw, a lever, and a transfer piece to move the lever toward the mobile jaw, where the mobile body is formed by the transfer piece.

13. A coffee maker with the milk-based drink production device in accordance with claim 1.

14. The coffee maker in accordance with claim 13, wherein the steam output nozzle tip is bent down.

* * * * *